US008009839B2

(12) United States Patent
Hagen

(10) Patent No.: US 8,009,839 B2
(45) Date of Patent: Aug. 30, 2011

(54) AUTOMOTIVE SENSORY ENHANCEMENT SYSTEM

(76) Inventor: Gary E. Hagen, Denver, CO (US)

( * ) Notice: Subject to any disclaimer, the term of this patent is extended or adjusted under 35 U.S.C. 154(b) by 431 days.

(21) Appl. No.: 12/404,117

(22) Filed: Mar. 13, 2009

(65) Prior Publication Data

US 2009/0232327 A1 Sep. 17, 2009

Related U.S. Application Data

(60) Provisional application No. 61/036,366, filed on Mar. 13, 2008.

(51) Int. Cl.
*H04B 1/00* (2006.01)

(52) U.S. Cl. .......................................... 381/86; 381/161

(58) Field of Classification Search .................... 381/86, 381/161, 122, 302
See application file for complete search history.

(56) References Cited

U.S. PATENT DOCUMENTS

| | | | | |
|---|---|---|---|---|
| 3,523,374 | A | 8/1970 | Schuster | |
| 3,831,172 | A | 8/1974 | Olliges et al. | |
| 3,845,572 | A | 11/1974 | McCanney | |
| 3,893,107 | A | 7/1975 | Schedler | |
| 4,077,138 | A | 3/1978 | Foerst | |
| 4,219,962 | A | 9/1980 | Dankman et al. | |
| 4,265,047 | A | 5/1981 | Meyer et al. | |
| 4,325,199 | A | 4/1982 | McEdwards | |
| 4,506,380 | A | 3/1985 | Matsui | |
| 4,946,416 | A | 8/1990 | Stern et al. | |
| 5,045,016 | A | 9/1991 | Stern et al. | |
| 5,204,971 | A | 4/1993 | Takahashi et al. | |
| 5,237,617 | A | 8/1993 | Miller | |
| 5,371,802 | A | 12/1994 | McDonald et al. | |
| 5,586,187 | A | 12/1996 | Webb | |
| 5,607,308 | A | 3/1997 | Copperman et al. | |
| 5,618,179 | A | 4/1997 | Copperman et al. | |
| 5,635,903 | A | 6/1997 | Koike et al. | |
| 5,820,442 | A | 10/1998 | Helder | |
| 5,835,605 | A | 11/1998 | Kunimoto | |
| 5,850,458 | A | 12/1998 | Tomisawa et al. | |
| 5,932,801 | A | 8/1999 | Akishita et al. | |
| 6,275,590 | B1 | 8/2001 | Prus | |
| 6,356,185 | B1 | 3/2002 | Plugge et al. | |
| 6,529,605 | B1 | 3/2003 | Christoph | |
| 6,592,375 | B2 | 7/2003 | Henry et al. | |
| 6,633,646 | B1 | 10/2003 | Hwang | |
| 6,725,150 | B1 | 4/2004 | Glandian | |
| 6,751,534 | B2 | 6/2004 | Robichaux et al. | |
| RE38,660 | E | 11/2004 | Novosel et al. | |
| 6,848,410 | B2 | 2/2005 | Hoffmann et al. | |
| 7,039,207 | B1 * | 5/2006 | Elrod et al. | 381/301 |
| 7,088,829 | B1 | 8/2006 | Schick et al. | |
| 2005/0094826 | A1 | 5/2005 | Morishita | |
| 2005/0201570 | A1 | 9/2005 | Honji | |

OTHER PUBLICATIONS

Make Your Car Sound Like Any Car You Want, http://www.vroombox.com/hime.html (retrieved from the internet on Oct. 17, 2006).

* cited by examiner

*Primary Examiner* — David Vu
(74) *Attorney, Agent, or Firm* — K Kalan; Peter B. Scull; Berenbaum Weinshienk PC

(57) ABSTRACT

A method of bringing automotive sound and sensation back into the automobile via the existing sound system, titrating the music and automotive noise together, and via a subwoofer or other vibrational means in the car seat or seats.

7 Claims, 3 Drawing Sheets

AUTOMOTIVE SENSORY ENHANCEMENT SYSTEM

CROSS REFERENCE TO RELATED APPLICATION

This application claims the benefit of priority under 35 U.S.C. §119(e) from U.S. Provisional Patent Application No. 61/036,366, entitled "Automotive Sensory Enhancement System", filed Mar. 13, 2008, which is incorporated herein in its entirety by this reference.

BACKGROUND

The developments hereof relate to automotive sensory enhancement systems in general, and particularly as these may be used in applications for enhancing the automobile driving experience in an enjoyable and visceral way. These developments further provide enhanced sensory feedback to the driver derived from the automobile's existing sensory output.

Today, people spend more and more time in their cars as part of their daily life. People also are spending more and more money on their cars and, as a result, expect and demand more of their cars. It is not unusual for a consumer to spend tens of thousands or hundreds of thousands of dollars on a car, and by doing so, indicate the importance of the car in their lives. On the upper end of the price spectrum, consumer appetites run to more powerful and better-handling cars, and consumer expectations are accordingly higher.

Today's cars are built to be quiet and insulated, and many have expensive high-end stereo systems that provide top quality sound to the driver. However, in such an insulated car, it is difficult to experience the sound of the car's engine. Moreover, the stereo system music may muffle the sound and feel of the engine.

Automotive enthusiasts have long been modifying car systems to increase the sensory output of the automobile and thereby enhancing the driving experience of the driver of an automobile. For example, cars' exhaust systems have been modified to enhance the sound of the engine. In that case, as the gears are shifted, greater feedback is given to the driver to enhance the enjoyment of driving.

Existing systems for enhancing automotive output, such a modifying the exhaust, typically have been generally directed to the enhancement to the exterior of the car rather than to the interior. Such systems would direct the experiential enhancement not only to the driver but also to all passers-by.

Considerations that may generally be encountered in designing systems for bringing sensations back into an automobile include finding a suitable manner for doing so, and balancing the sound and sensation of the engine in such a way as to make the experience maximally enjoyable for the driver.

Prior such solutions for bringing driving sensations back into the vehicle have included devices to bring car sound into the car, such as the "Vroom Box". The "Vroom Box" is a box mounted inside the car and designed to simulate the sounds of another, more high-end car. It appears that the "Vroom Box utilizes a powerful microprocessor to digitally recreate the sound of 15 different cars and fantasy vehicles . . . ." This does not, however, allow a driver to experience the existing sounds of their own car.

Other solutions for bringing car sound back into a car include devices for the targeted sound transmission from an intake tract of an internal combustion engine to the interior of a motor vehicle. However, these devices do not specify the means of broadcast of the sound transmission within the car, nor do they disclose the subwoofer or vibrational means in the car seat or seats.

Another apparatus known in the art produces sounds corresponding to the operation of an internal combustion engine in the interior space of a motor vehicle. The apparatus is characterized by a pressure sensor, an amplification device, and a speaker. However, again, this does not disclose integration of the sound through the existing speaker system and in balance with the music. This also does not disclose the subwoofer or vibrational means in the car seat or seats.

Yet another method known in the art concerns microphones that collect engine sound and process the engine sound via a speaker provided to an interior of a vehicle. As above, however, this neither discloses integration of the sound through the existing speaker system and in balance with the music nor the subwoofer or vibrational means in the car seat or seats.

In sum, the prior art does not appear to cover the integrative means of bringing sound back into the car via the stereo system and balancing the automotive sound with the existing music sounds. Furthermore, the prior art does not appear to disclose a vibrational means of bringing sensation to the driver or passenger through the driver's or passenger's seat.

SUMMARY

The present development may be directed generally to allowing the driver and passengers of a car to experience the enhanced sound and vibration of the car from within the comfort of the car. The system may have an integrated stereo system for bringing in the sound. The system may include a subwoofer or other vibrational mechanism for enhancing the vibration. The sound systems could allow for a titration of the music and auto noise balance to maximize delivery of both to the interior of the vehicle.

BRIEF DESCRIPTION OF THE DRAWINGS

Apparatuses and methods hereof will be better understood by reference to the following more detailed description and accompanying drawings in which.

DETAILED DESCRIPTION

Described herein is a system for bringing the sound and sensation of a vehicle back into the vehicle for the passengers' benefit. The present development relates to bringing the engine and exhaust sound and sensation into the car. This development would allow the driver to selectively experience the output of the automobile from the comfort of the interior of the car.

The present development could be implemented by bringing in microphones from the exhaust and integrating the imported sound through the car's audio system. This could be done electronically, by having optimally patterned sound that is controlled by the engine speed. The sound could be 'dialed in' to complement the natural car sounds. The sound system could be integrated into the speaker system. The sound system and speakers could be optimally constructed to reproduce and amplify the specific frequencies desired.

Another incarnation of the present development could be installed in or under the driver's seat or other seats to enhance the visceral driving sensation. Much like professional drummers have a vibration device that attaches to the stool stem to transmit vibration to the drummer to give them the feel of the music, the driver's seat could have devices that would amplify and transmit the vibration of the car directly to the driver. This could take the form of a low frequency subwoofer or other means of amplification and transmission. This feature may also receive input from the stereo and allow for titration of the car sensation and music sensation for a combined sensory experience.

Other possible features or enhancements might include an on/off volume control in the shifter or near the shifter. Another enhancement might include a reverb mechanism.

An aspect of the present development is to allow the driver of a modern, insulated and sound-system-equipped vehicle to also experience the sounds and sensations of the engine, if they desire. The present development would allow the driver to select whether, when and how to experience the engine with easily manipulated controls.

Figure 1:
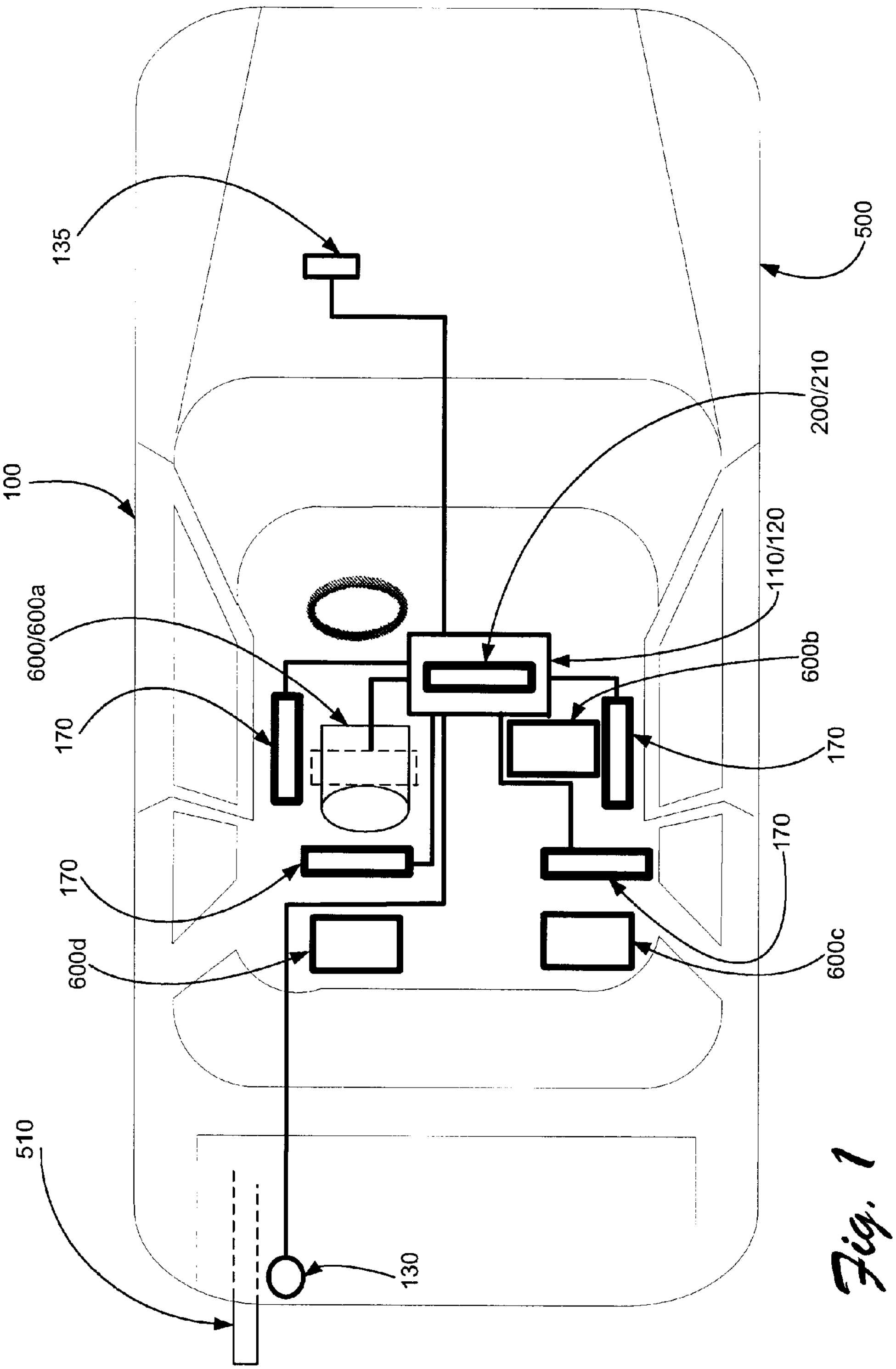
FIG. 1 is a cross-sectional schematic plan of a car with the system hereof.
Figure 2:
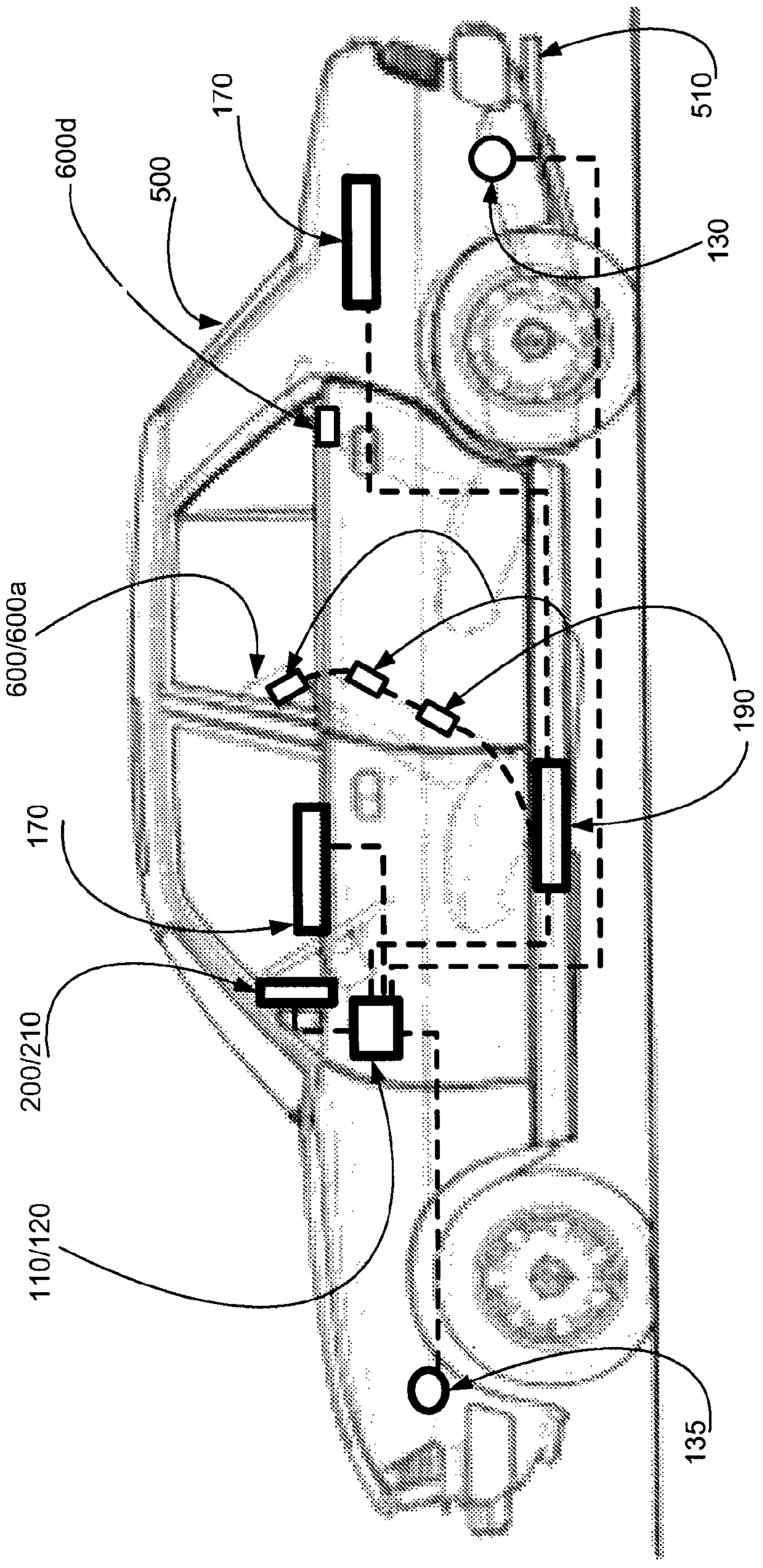
FIG. 2 is a cross-sectional schematic elevation of a car with the system hereof.
Figure 3:
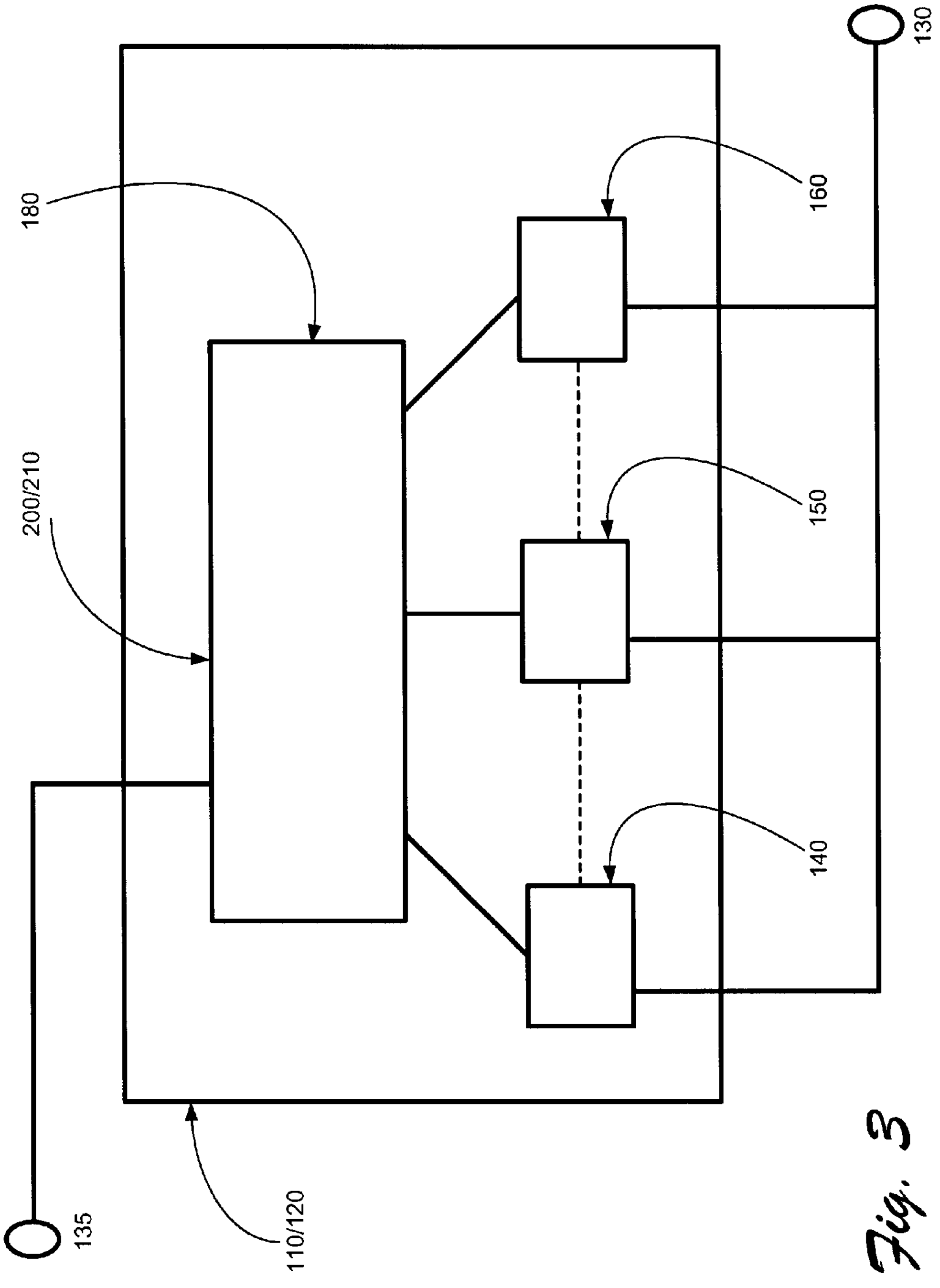
FIG. 3 is an electromagnetic communications diagram of the sound processing center hereof.

Accordingly, such a system 100, is illustrated, for example in FIGS. 1-3, and may advantageously be used to bring sound into an automobile 500 via an integrated sound sub-system 110. The system 100 may alternatively also be used to bring in sensation into the automobile via a subwoofer or other vibrational system 120. The two systems 110, 120 may be manipulated by the driver or passenger via an integrated sound and vibration customizer and balancer 200, represented generally by and at the control panel 210, of which and by which each includes only a part of the other.

The integrated sound system 110 may derive its input from an exhaust sensor microphone 130 located near or around an exhaust portal 510 of the automobile 500. The exhaust sensor microphone 130 may transmit sounds or other input to one or more of a sound recorder 140, a sound enhancer 150, or an amplifier 160. The sounds or other input may be processed through a pre-amplifier or sound enhancer 150. The sounds or other input may then be processed through an amplifier 160. The amplifier 160 may then transmit the processed sound through the one or more integrated speakers 170 and thereby to the interior of the automobile. The sound may be processed through the integrated sound and vibration customizer 200 for playback to the driver or passengers.

The integrated sensation system 120 may alternatively or additionally derive its input from an engine rpm transmitter 135 located near or around the engine of the automobile. The engine rpm transmitter 135 may then transmit data to the subwoofer or other vibrational means 190 in or adjacent to the driver's or passenger's seat. A receiver amplifier vibe control 180 may modulate the sensation delivered to the driver or passenger through the subwoofer or other vibrational means 190. The sensation may be managed through the integrated sound and vibration customizer 200 by the driver or passengers.

Both the integrated sound system 110 and the integrated sensation system 120 may be controlled by the driver or passengers by way of an integrated sound and vibration customizer 200, located conveniently in the interior of the automobile.

The sound implementation hereof may include the patterning of computer sound, the use of microphones, and acoustic treatment of the noise with reverberation and enhancements to maximize the enjoyment of the music/engine noise balance. This may be achieved using the sound enhancer 150 as controlled by the integrated sound and vibration customizer 200.

The sensation implementation may include a subwoofer or other vibratory device 190 in or under the seat 600 or seats 600*a-d*, much in the same manner that a gaming chair incorporates sensory features that can enhance the gaming experience. Both implementations might incorporate a separate control on an existing or pre-existing stereo to activate the sound enhancement function and the sensation enhancement function. This control mechanism may also be located in more readily accessible parts of the car, such as the wheel or shift knob. There may also be presets available to customize settings for individual drivers or passengers. The driver or passengers may be able to balance or titrate the engine sensation with the music sensation via the control mechanism. The vibrational sensation may be segregated, for example, low vibrations could be experienced under or lower on the seat, mid-level vibrations may be experienced higher or than the low-level vibrations or in the middle of the seat, and higher vibrations may be experienced in the upper portion of the seat or headrest. The control mechanism may allow for the music sensation and sound sensation to titrated in such a manner that, although the music sound may be at a lower volume in order to allow the engine noise to be heard, the driver or passengers could still get the vibrational sensation of the music through the seat or seats.

The existing art does not sufficiently address this need, in that it does not disclose the sensation aspect of the present disclosure. Furthermore, the existing art regarding the sound concept does not sufficiently address the integration of the sound into the existing acoustic features of the car, nor does it cover the other enhancements disclosed herein. The present disclosure addresses the need to bring the overall experience of the car to the driving enthusiast in one complete package. It also provides the flexibility of turning the enhancements on or off, rather than having to permanently modify a car to make the engine enhancements audible. Furthermore, it provides the option of balancing the engine sound and sensation with the music sound and sensation, allowing the car enthusiast to experience all simultaneously.

This development may allow the driver to purchase an automobile with pre-installed componentry to enable sound and sensation to be brought into the car. This could be presented as an option, much like other automobile options such as a preinstalled DVD player or upgraded sound system. Preinstallation of the system would likely be less expensive and more efficient than when installed as an after-market item.

Incorporation of the necessary device or devices into an existing automobile design may result in fewer parts within the automobile to achieve the same end. Other after-market solutions may require several pieces or other enabling mechanisms to allow the componentry to execute its designated task. The present development may achieve such a result with integrated, pre-market pieces.

The manufacture of this development may be advantageous relative to the manufacture of other solutions for bringing sound back into an automobile. The manufacture of the development may be straightforward and inexpensive, and use basic materials that are readily available. The development may also be visually more appealing than previously proposed solutions. The device may be manufactured in a manner that results in a sleek, efficient, and aesthetically integrated appearance. Whereas after-market pieces may conflict aesthetically with the design of a high-end automobile, pre-market pieces may be designed so as not to detract from the overall appeal of the automobile.

A development for bringing the sound and sensation back into an automobile has been described above in considerable detail. This was done for illustrative purposes. Neither the specific implementations of the development as a whole, nor those of its features, limit the general principles underlying the development. In particular, the development is not necessarily limited to the specific constituent materials and proportions of constituent materials used in making the development. The development is also not necessarily limited to a development as specifically described herein, but may extend to other applications as well. The specific features described herein may be used in some implementations, but not in others, without departure from the spirit and scope of the development as set forth. Many additional modifications are intended in the foregoing disclosure, and it will be appreciated by those of ordinary skill in the art that, in some instances, some features of the development will be employed in the absence of other features. Additional features may be implemented as well. The illustrative examples therefore do not define the metes and bounds of the development and the legal protection afforded the development, which function is served by the claims and their equivalents.

Accordingly, what is claimed is:

1. A system for bringing automotive sound back into an automobile, comprising:

an exhaust sensor microphone placed near the engine;

an engine rpm transmitter;

a sound processing center;

a stereo speaker or speakers;

an integrated sound and vibration customizer and balancer;

a master control within a speaker system;

wherein the system is adapted to bring the sound of the engine into the car through the stereo speakers.

2. A system according to claim 1, wherein the sound processing center includes a sound recorder.

3. A system according to claim 1, wherein the sound processing center includes a pre-amplifier or sound enhancer.

4. A system according to claim 1, wherein the sound processing center includes an amplifier.

5. A system for bringing physical sensation of an automobile into the automobile, comprising:

an engine rpm transmitter;

a sensor or sensors disposed in the car seat or seats;

a receiver amplifier vibe control;

a seat with subwoofer or vibrating mechanism;

an integrated sound and vibration customizer and balancer;

wherein the system is adapted to bringing the vibrational sensation of the engine into the car through the seat or seats.

6. The system of claim 5, wherein the system is adapted to bring the vibrational sensation of the music through the seat or seats.

7. A system for bringing automotive sound and automotive physical sensation back into an automobile, comprising:

an exhaust sensor microphone placed near the engine;

an engine rpm transmitter;

a sound processing center;

a stereo speaker or speakers;

a sensor or sensors disposed in the car seat or seats;

a receiver amplifier vibe control;

a seat with subwoofer or vibrating mechanism;

an integrated sound and vibration customizer and balancer;

wherein the system is adapted to bring the sound of the engine into the car through the stereo speakers and the vibrational sensation of the engine into the car through the seat or seats.

* * * * *